United States Patent

Nakashima et al.

Patent Number: 5,558,699
Date of Patent: Sep. 24, 1996

[54] THERMOCHROMIC COLOR-MEMORY COMPOSITION

[75] Inventors: Akio Nakashima, Tsushima; Yutaka Shibahashi, Nagoya, both of Japan

[73] Assignee: The Pilot Ink Co., Ltd., Nagoya, Japan

[21] Appl. No.: 362,984

[22] Filed: Dec. 23, 1994

[30] Foreign Application Priority Data

Dec. 24, 1993 [JP] Japan .................................. 5-347757
Aug. 2, 1994 [JP] Japan .................................. 6-201445

[51] Int. Cl.$^6$ ............................................. C09D 11/00
[52] U.S. Cl. .................. 106/21 A; 106/316; 428/402.2; 428/913; 503/200; 503/201; 503/204; 503/209; 503/213
[58] Field of Search .................. 428/402.2, 913; 106/316, 21 A; 503/200, 201, 204, 209, 213

[56] References Cited

U.S. PATENT DOCUMENTS

| | | | |
|---|---|---|---|
| 1,592,148 | 7/1926 | Munn | 401/1 |
| 4,028,118 | 6/1977 | Nakasuji et al. | 106/21 |
| 4,176,273 | 11/1979 | Fujie | 219/220 |
| 4,717,710 | 1/1988 | Shimizu et al. | 503/213 |
| 4,720,301 | 1/1988 | Kito et al. | 106/21 |
| 4,725,462 | 2/1988 | Kimura | 428/29 |
| 4,818,215 | 4/1989 | Taga | 431/126 |
| 4,820,683 | 4/1989 | Vervacke et al. | 503/210 |
| 4,895,827 | 1/1990 | Vervacke et al. | 503/210 |
| 4,917,643 | 4/1990 | Hippely | 446/14 |
| 4,920,991 | 5/1990 | Shibahashi et al. | 132/73 |
| 5,079,049 | 1/1992 | Kito et al. | 428/24 |

FOREIGN PATENT DOCUMENTS

| | | | |
|---|---|---|---|
| 3545813 | 6/1987 | Germany. | |
| 2184450 | 6/1987 | United Kingdom. | |
| 2205255 | 12/1988 | United Kingdom | 446/14 |

*Primary Examiner*—Mark L. Bell
*Assistant Examiner*—Scott L. Hertzog
*Attorney, Agent, or Firm*—Fitzpatrick, Cella, Harper & Scinto

[57] ABSTRACT

A thermochromic color-memory compositions exhibiting high color contrast between high color density in a colored state and sufficiently low color density in a decolored state with high freedom of selection of the reaction medium, and highly useful as a thermochromic material. The thermochromic color-memory composition comprises a homogeneous solubilized mixture of essential three components of (a) an electron-donating color-developing organic compound, (b) an electron-accepting compound, and (c) a reaction medium for controlling a color reaction of the component (a) with the component (b); the component (c) being selected from aliphatic ketones of 10 to 22 total carbons and aryl alkyl ketones of 12 to 24 total carbons; and the composition changing the color thereof with a large hysteresis width ($\Delta H$) of from 8° C. to 80° C.

3 Claims, 1 Drawing Sheet

FIGURE
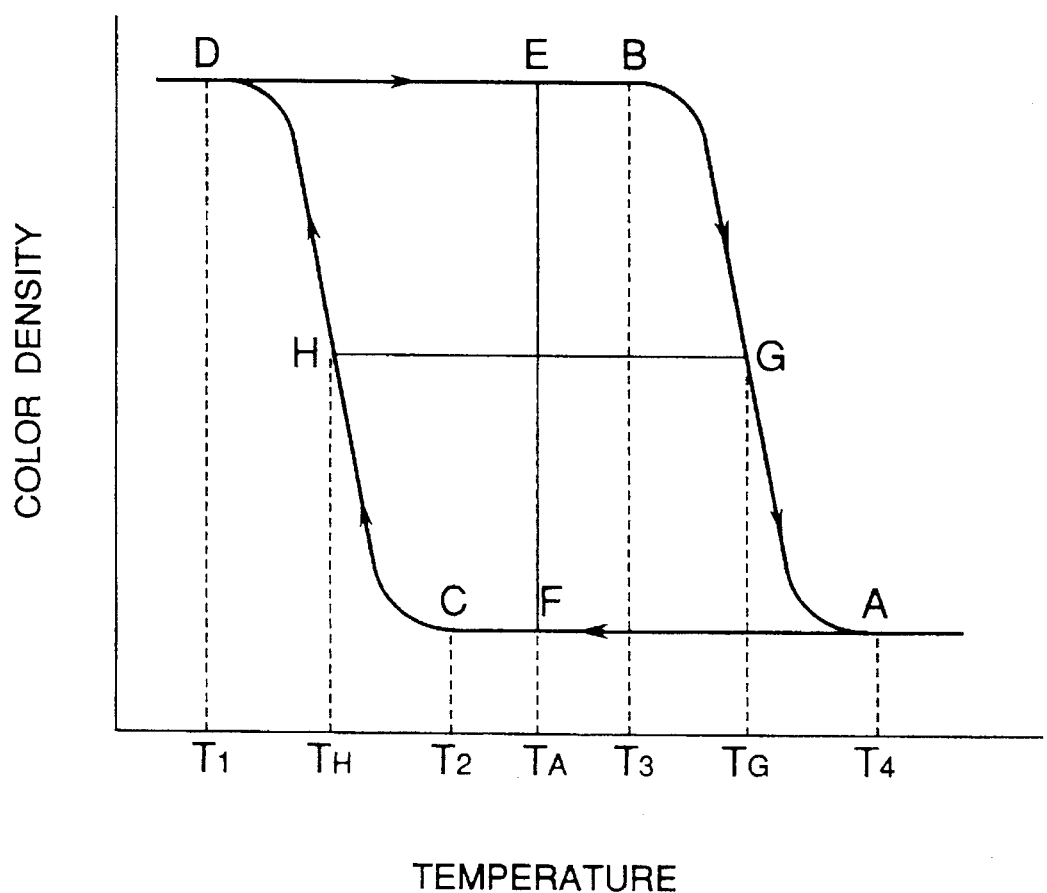

THERMOCHROMIC COLOR-MEMORY COMPOSITION

BACKGROUND OF THE INVENTION

1. Field of the Invention

The present invention relates to a thermochromic color-memory composition. More particularly, the present invention relates to a thermochromic color-memory composition which has remarkable hysteresis characteristics in temperature change to exhibit reversible color change between a colored state and a decolored state, and the colored or decolored state is retained reversibly at ordinary temperature range after stopping the heating or cooling for the color change.

2. Related Background Art

Conventional reversible thermochromic materials change their color with change of temperature at a certain color change temperature. At ordinary temperature, the materials assume only one of the two colors. The other color is retained only when the heating or cooling is being applied to the material to keep the color state. The color changes to the ordinary-temperature color when the heating or cooling is discontinued to bring the material to ordinary temperature.

On the other hand, a thermochromic color-memory material is disclosed in U.S. Pat. No. 4,720,301. This type of thermochromic color-memory material retains any one of the high-temperature color and the low-temperature color selectively at ordinary temperature even after the heating or cooling for the color change is discontinued, and either color may be assumed reversibly at ordinary temperature by heating or cooling, if necessary. Therefore, this type of material is useful in various application fields such as temperature-sensitive recording materials, toys, ornaments, and printing materials.

This kind of color-memory effect could be achieved only with the system employing a specified ester compound for controlling the color reaction. Therefore the usefulness of the thermochromic material was limited, and a more effective compound is eagerly waited for.

It was found by the inventors of the present invention, after comprehensive studies on the color reaction medium for the color-memory thermochromism, that a system employing a compound selected from aliphatic ketones of 10 to 22 total carbons and aryl alkyl ketones of 12 to 24 total carbons has large hysteresis width ($\Delta H$) in the thermochromism to exhibit effective color-memory effect and to give extremely high color contrast between the colored state and the decolored state. Thus the present invention has been accomplished.

SUMMARY OF THE INVENTION

The present invention intends to provide a thermochromic color-memory compositions exhibiting high color contrast between high color density in a colored state and sufficiently low color density in a decolored state with high freedom of selection of the reaction medium, and highly useful as a thermochromic material.

The thermochromic color-memory composition of the present invention comprises a homogeneous solubilized mixture of essential three components of (a) an electron-donating color-developing organic compound, (b) an electron-accepting compound, and (c) a reaction medium for controlling a color reaction of the component (a) with the component (b); the component (c) being selected from aliphatic ketones of 10 to 22 total carbons and aryl alkyl ketones of 12 to 24 total carbons; and the composition changing the color thereof with a large hysteresis width ($\Delta H$) of from 8° C. to 80° C.

The aryl alkyl ketone is preferably selected from phenyl alkyl ketones. The homogeneous solubilized mixture is preferably enclosed in microcapsule.

BRIEF DESCRIPTION OF THE DRAWING

Figure is a graph showing hysteresis characteristics of the thermochromic color-memory composition of the present invention in dependence of color density on temperature. In the Figure, $T_1$ denotes the complete coloring temperature; $T_2$ denotes the minimum color retaining temperature; $T_3$ denotes the maximum color retaining temperature; and $T_4$ denotes the complete decoloring temperature.

DETAILED DESCRIPTION OF THE PREFERRED EMBODIMENTS

The hysteresis characteristics of the thermochromic color-memory composition of the present invention is explained by reference to FIG. 1 showing the dependence of color density on temperature.

In the Figure, the ordinate shows the color density, and the abscissa shows the temperature. The color density of the composition changes with temperature along the curve in the direction shown by the arrow marks. The point A indicates the color density at the minimum temperature $T_4$ for achieving a complete decolored state (hereinafter $T_4$ is referred to as complete decoloring temperature). The point B indicates the maximum temperature $T_3$ for retention of the complete colored state (hereinafter $T_3$ is referred to as maximum color retaining temperature). The point C indicates the color density at the minimum temperature $T_2$ for achieving a complete colored state (hereinafter $T_2$ is referred to as minimum color retaining temperature). The point D indicates the maximum temperature $T_1$ for achieving the complete colored state (hereinafter $T_1$ is referred to as complete coloring temperature). At the temperature $T_A$, two phases of a colored state (point E) and a decolored state (point F) can exist. In the temperature range including the temperature $T_A$ where the colored state phase and the decolored state phase can exist, the changed color state can be retained. The length of the line segment EF is a measure for the contrast of the color change. The length of the line segment HG passing the midpoint of the line segment EF is a temperature width showing the degree of the hysteresis (the temperature width is hereinafter referred to hysteresis width $\Delta H$). The larger the $\Delta H$ value, the more easily is the changed color state retained. The $\Delta H$ value for retention of the color state can be in the range of from 8° C. to 80° C. according to the experiment made by the inventors of the present invention.

The effective temperature range in which the two phases of the colored state and the decolored state can substantially be retained, namely the temperature width between $T_3$ and $T_2$ including $T_A$ is practically in the range of from 2° C. to 80° C.

The color densities at the state E and the state F are denoted respectively by the lightness values of $V_E$ and $V_F$ for the measure of the contrast corresponding to the length of the line segment EF, and the degree of the contrast is represented by $\Delta V$ ($=V_F-V_E$). The lightness values at the colored state and the decolored state means the lightness of Munsel notation system in which complete black is represented by a numeral 0 (zero) and complete white is represented by a numeral 10 and the lightness is divided into levels of equal sensation interval in the gray scale. The lightness of a chromatic color is represented by the lightness of achromatic color of the same lightness sensation. The lower lightness value means the color closer to black, and the higher lightness value means the color closer to white. Therefore, the lightness value is useful as the measure for the color density in the colored state and the residual color at the decolored state. The lightness difference ($\Delta V$) is an index of the contrast. The color density difference of the same hue of chromatic colors can be shown by the lightness difference irrespectively of the kind of hue.

The ratio of the three components (a), (b), and (c) are selected depending on the desired conditions of the color density, the color change temperature, the type of the color change, and kinds of the components. Generally, for achieving the desired characteristics, to one part of the component (a), the component (b) is employed in an amount ranging from 0.1 to 50 parts, preferably from 0.5 to 20 parts, and the component (c) is employed ranging from 1 to 800 parts, preferably from 5 to 200 parts (the "part" herein is based on weight).

Each of the components may be a mixture of two or more constituents, and the composition may further contain an additive such as an antioxidant, a UV absorber, a singlet oxygen quencher, an infrared absorber, a dissolution aid, and the like, provided that the function of the composition is not impaired. Furthermore, color change from one colored state (colored state (1)) to another colored stated (colored state (2)) can be actualized by incorporating a usual pigment (non-thermochromic pigment) into the thermochromic composition.

The examples of the compounds for the respective components (a), (b), and (c) are shown below specifically.

The component (a), the electron-donating color-developing compound, includes known compounds: diphenyl-phthalides, fluorans, diphenyl-azaphthalides, indolylphthalides, phenylindolyl-phthalides, phenylindolylazaphthalides, styrylquinolines, pyridines, quinazolines, bisquinazolines, and so forth.

Specific examples are shown below:
3,3-bis(p-dimethylaminophenyl)-6 -dimethylaminophthalide,
3-(4-diethylaminophenyl)-3-(1-ethyl-2-methylindol-3 -yl)phthalide,
3-(4-diethylamino-2-methylphenyl)-3-(1-ethyl-2 -methylindol-3-yl)-4-azaphthalide,
3-(4-diethylamino-2-ethoxyphenyl)-3-(1-ethyl-2 -methylindol-3-yl)-4-azaphthalide,
2-N-cyclohexyl-N-benzylamino-6-diethylaminofluoran,
2-p-butylphenylamino-6-diethylamino-3-methylfluoran,
1,3-dimethyl-6-diethylaminofluoran,
2-chloro-3-methyl-6-diethylaminofluoran,
3-dibutylamino-6-methyl-7-anilinofluoran,
3-diethylamino-6-methyl-7-anilinofluoran,
3-diethylamino-6-methyl-7-xylidinofluoran,
2-(2-chloroanilino)-6-dibutylaminofluoran,
3,6-dimethoxyfluoran,
3,6-di-n-butoxyfluoran,
1,2-benzo-6-diethylaminofluoran,
1,2-benzo-6-dibutylaminofluoran,
3-(1-butyl-2-methylindol-3-yl)-3-(1-octyl-2 -methylindol-3-yl)-1(3H)isobenzofuranone,
1,2-benzo-6-ethylisoamylaminofluoran,
2-methyl-6-(N-p-tolyl-N-ethylamino)fluoran,
3,3-bis(1-n-butyl-2-methylindol-3-yl)phthalide,
3,3-bis(1-ethyl-2-methylindol-3-yl)phthalide,
2-(N-phenyl-N-methylamino)-6-(N-p-tolyl-N-ethylamino)fluoran,
2-(3'-trifluoromethylanilino)-6-diethylaminofluoran,
3-chloro-6-cyclohexylaminofluoran,
2-methyl-6-cyclohexylaminofluoran,
3-methoxy-4-dodecyloxystyrylquinoline,
4-(4'-methylbenzylaminophenyl)pyridine,
2,6-diphenyl-4-(4'-dimethylaminophenyl)pyridine,
2,6-bis(4'-methoxyphenyl)-4-(4'-dimethylaminophenyl)pyridine,
2,6-dimethyl-3,5-biscarboethoxy-4-(4'-dimethylaminophenyl)pyridine,
2-(2'-octyloxyphenyl)-4-(4'-dimethylaminophenyl)-6-phenylpyridine,
2,6-diethyoxy-4-(4'-diethylaminophenyl)pyridine,
2-(4'-dimethylaminophenyl)-4-methoxyquinazoline,
2-(4'-dimethylaminophenyl)-4-phenoxyquinazoline,
2-(4'-dimethylaminophenyl)-4-(4''-nitorphenyloxy)quinazoline,
2-(4'-phenylmethylaminophenyl)-4-phenoxyquinazoline,
2-(4'-piperidinophenyl)-4-phenoxyquinazoline,
2-(4'-dimethylaminophenyl)-4-(4''-chlorophenyloxy)quinazoline,
2-(4'-dimethylaminophenyl)-4-(4''-methoxyphenyloxy)quinazoline,
4,4'-(ethylenedioxy)-bis[2-(4-diethylaminophenyl)quinazoline],
4,4'-[propylenedioxy(1,3)]-bis[2-(4-diethylaminophenyl)quinazoline],
4,4'-[butylenedioxy(1,3)]-bis[2-(4-diethylaminophenyl)quinazoline],
4,4'-[butylenedioxy(1,4)]-bis[2-(4-diethylaminophenyl)quinazoline],
4,4'-(oxydiethylene)-bis[2-(4-diethylaminophenyl)quinazoline],
4,4'-ethylene-bis[2-(4-piperidinophenyl)quinazoline],
4,4'-ethylene-bis[2-(4-di-n-propylaminophenyl)quinazoline],
4,4'-(ethylenedioxy)-bis[2-(4-di-n-butylaminophenyl)quinazoline],
4,4'-cyclohexylene-bis[2-(4-diethylaminophenyl)quinazoline],
and the like.

The electron-accepting compound of the aforementioned component (b) includes compounds having an active proton, pseudo acid compounds (not an acid but behaves as an acid in the composition to allow the component (a) to develop color), compounds having electron hole, and so forth.

The compounds having an active proton are exemplified by compounds having a phenolic hydroxyl group including monophenols and polyphenols, which may have a substituent such as alkyl, aryl, acyl, alkoxycarbonyl, carboxyl and esters and amides thereof, and halogen, bis type phenols, tris type phenols, phenol-aldehyde condensation resins, and the like. The compound may be a salt of the phenolic hydroxyl group of the above compounds.

The compounds are specifically exemplified by:
phenol, o-cresol, t-butylcatechol, nonylphenol, n-octylphenol, n-dodecylphenol, n-stearylphenol, p-chlorophenol, p-bromophenol, o-phenylphenol,
4-(1-methylethoxyphenyl)sulfonylphenol,
4-(4-butoxyphenyl)sulfonylphenol,
4-(4-pentyloxyphenyl)sulfonylphenol,
4-(4-hexyloxyphenyl)sulfonylphenol,
4-(4-heptyloxyphenyl)sulfonylphenol, 4-(4-octyloxyphenyl)sulfonylphenol,
n-butyl p-hydroxybenzoate, n-octyl p-hydroxybenzoate, resorcin, dodecyl gallate,
2,2-bis(4'-hydroxyphenyl)propane,
4,4-dihydroxydiphenyl sulfone,
1,1-bis(4'-hydroxyphenyl)ethane,
2,2-bis(4'-hydroxy-3-methylphenyl)propane,
bis(4-hydroxyphenyl) sulfide,
4-hydroxy-4'-isopropoxydiphenyl sulfone
1-phenyl-1,1-bis(4'-hydroxyphenyl)ethane,
1,1-bis(4'-hydroxyphenyl)-3-methylbutane,
1,1-bis(4'-hydroxyphenyl)-2-methylpropane,
1,1-bis(4'-hydroxyphenyl)-n-hexane,
1,1-bis(4'-hydroxyphenyl)-n-heptane,
1,1-bis(4'-hydroxyphenyl)-n-octane,
1,1-bis(4'-hydroxyphenyl)-n-nonane,
1,1-bis(4'-hydroxyphenyl)-n-decane,
1,1-bis(4'-hydroxyphenyl)-n-dodecane,
2,2-bis(4'-hydroxyphenyl)butane,
2,2-bis(4'-hydroxyphenyl)ethyl propionate,
2,2-bis(4'-hydroxyphenyl)-4-methylpentane,
2,2-bis(4'-hydroxyphenyl)hexafluoropropane,
2,2-bis(4'-hydroxyphenyl)-n-heptane,
2,2-bis(4'-hydroxyphenyl)-n-nonane,
and the like.

The aforementioned compounds having a phenolic hydroxyl group are the most effective for the thermochromism characteristics as the component (b). The compounds may be metal salts of the above phenolic compounds, aromatic carboxylic acids, fatty acids of 2 to 5 carbons, metal salts of the above carboxylic acids, hydrophosphate esters and metal salts thereof, 1,2,3-trizole and derivatives thereof, and the like.

The component (c) includes aliphatic ketones of 10 to 22 total carbons and aryl alkyl ketones of 12 to 24 total carbons.

The aliphatic ketones of 10 to 22 total carbons are specifically exemplified by:
2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-henicosane, 2-docosanone, and the like.

The aryl alkyl ketones of 12 to 24 total carbons are exemplified specifically by:
n-octadecaphenone, n-heptadecaphenone,
n-hexadecaphenone, n-pentadecaphenone,
n-tetradecaphenone, 4-n-docecanoacetophenone,
n-tridecanophenone, 4-n-undecanoacetophenone,
n-laurophenone, 4-n-decanoacetophenone,
n-undecanophenone, 4-n-nonylacetophenone,
n-decanophenone, 4-n-octylacetophenone,
n-nonanophenone, 4-n-heptylacetophenone,
n-octanophenone, 4-n-hexylacetophenone,
4-n-cyclohexylacetophenone, 4-t-butylpropiophenone,
n-heptanophenone, 4-n-pentylacetophenone, cyclohexyl phenyl ketone, benzyl n-butyl ketone,
4-n-butylacetophenone, n-hexanophenone,
4-isobutylacetophenone, 1-acetonaphthone,
2-acetonaphthone, cyclopentyl phenyl ketone, and the like.

One or more of the compounds selected from the aforementioned ketones are used as the component (c) of the present invention. In addition thereto, another compound selected from esters, alcohols, carboxylic acids, amides or the like may be added, if necessary, in such an amount that the hysteresis characteristics are not significantly affected.

The amount of the additive is not more than 50 parts by weight for 50 parts by weight of the ketone of the present invention to obtain the desired color-memory effect.

The above-described homogeneous solubilized mixture of the essential three components may be enclosed in microcapsules by a known microcapsule technique. A larger ΔH value can be obtained by the microparticulate composition (in a size of 0.5 to 50 μm, preferably 1 to 30 μm) in comparison with a non-particulate form. Further, the composition is protected by the capsule wall against chemically active substances such as acidic substances, basic substances, peroxides, etc. and solvents to maintain the inherent properties of the composition and to give heat stability.

The available microcapsule formation technique includes interfacial polymerization, in-situ polymerization, solution-curing coating, phase separation from an aqueous solution, phase separation from an organic solvent solution, melt-dispersion cooling, gas suspension coating, spray drying, and so forth. The technique is suitably selected for the purpose. The surface of the microcapsules may further be coated by a secondary film of a resin to give durability to the microcapsules or to improve the surface properties for practical use.

The compound selected from the above aryl alkyl ketones and aliphatic ketones of the present invention as the reaction medium of the electron-exchange color reaction gives various effects: the compound gives thermochromic characteristics with a larger hysteresis width (ΔH) regarding the dependence of the color density on temperature; the compound enables the thermochromic composition to exhibit extremely high contrast (ΔV) owing to high color density in a colored state and low color density in a decolored state; and the compound, when the composition is enclosed in microcapsules, gives further increase of ΔH value to exhibit color-memory effect and higher hysteresis characteristics.

The above effects, although not elucidated sufficiently and theoretically, are presumably caused by relatively high polarization, at the same melting point, of the compound which is selected from the aryl alkyl ketones and aliphatic ketones of the present invention and has relatively less total carbon atoms in the molecule in comparison with esters, regarding the high contrast. The thermochromic behavior is reproducible as shown in the measurement data in Examples shown later.

The present invention is described below more specifically by reference to examples without limiting the invention in any way.

The processes for producing the thermochromic color-memory composition and the microcapsular thermochromic color-memory pigment, the methods for measuring the hysteresis characteristics in temperature change of the microcapsular pigment and for measuring the contrast thereof are describe below.

In the description below, "parts" of the components is based on weight.

EXAMPLE 1

0.1 Part of Crystal Violet Lactone [3,3-bis(p-dimethylamino-phenyl)- 6-dimethylaminophthalide] as the component (a), 0.1 part of bisphenol A [2,2-bis(4'-hydroxyphenyl)-propane] as the component (b), and 2.5 parts of n-hexanophenone were mixed, and the mixture was heated with stirring up to 120° C. to dissolve the components to form a homogeneous solubilized mixture of the three components.

The homogeneous solubilized mixture was filled in a transparent glass capillary of 1 mm in inside diameter and 78 mm in length to a height of 10 mm, and the capillary was sealed to provide Test Sample 1.

The lower portion of Test Sample 1, 40 mm from the lower end of the capillary, was immersed in a beaker holding an antifreeze liquid at −10° C. A white paper sheet was placed vertically behind the beaker for observation of the color density change with the temperature. The antifreeze liquid was warmed from −10° C. at a rate of +1° C./min by means of a Handy Cooler (manufactured by Thomas Scientific Co.).

The color change of Test Sample 1 was observed visually. Test Sample 1 was blue to 15° C. ($T_3$); then the color density decreased with warming to become completely colorless and transparent at 26° C. ($T_4$), and the transparency was retained up to 40° C.

Test Sample 1 at the elevated temperature of 40° C. was cooled at a rate of −1° C./min. The colorless transparent state was retained without any change to the temperature of 8° C. ($T_2$), and turned pale blue below 8° C., then the color density became higher with the cooling, and became complete blue at 4° C. ($T_1$). The color density at 4° C. did not change when the sample was cooled to −10° C.

EXAMPLES 2 TO 11

The thermochromic color-memory compositions of respective Examples were prepared in the same manner as in Example 1 except that the component (c) was changed. the hysteresis characteristics were measured in the same manner as in Example 1.

The results of experiments are shown in Table 1, including the component (c) employed, and measured values of $T_1$, $T_2$, $T_3$, $T_4$, $T_H$ (temperature corresponding to the middle point of the color density change in the color-developing process), $T_G$ (temperature corresponding to the middle point of the color density change in the decoloring process), and ΔH (line section HG).

EXAMPLE 12

(Production of Microcapsular Thermochromic Color-Memory Pigment)

3.0 Parts of 3-dibutylamino-6-methyl-7-anilinofluoran as the electron-donating color-developing organic compound (a), 8.0 parts of 2,2-bis(4-hydroxyphenyl)propane as the phenolic compound (b), and 50.0 parts of n-laurophenone as the component (c) were mixed, and the mixture was heated with stirring up to 120° C. to dissolve the components to obtain a homogeneous solubilized mixture of the three components. The mixture was further mixed with a solution of 10 parts of Epon 828 [epoxy resin, produced by Yuka Shell Epoxy K.K.] in 10 parts of methyl ethyl ketone. The resulting mixture was added dropwise into 100 parts of aqueous 10% gelatin solution, and it was stirred to form fine droplet thereof. Thereto, a solution of 5 parts of a curing agent, Epi Cure U (an epoxy resin amine adduct, produced by Yuka Shell Epoxy K.K.) in 45 parts of water was added gradually, and the mixture was stirred for about 5 hours at 80° C. to obtain a microcapsule suspension. The resulting microcapsules were collected by centrifugation to obtain a microcapsular thermochromic color-memory pigment which had a water content of 40% by weight and average particle diameter of 10 µm, and capable of changing the color between black and non-color.

(Measurement of Hysteresis Characteristics)

Printing inks were prepared respectively by dispersing 40 parts of the above microcapsular thermochromic color-memory pigment into a mixture of 50 parts of ethylene-vinyl acetate emulsion, 1 part of an antifoaming agent, 1 part of a leveling agent, and 8 parts of water. With this ink, solid printing was conducted on a white wood-free paper sheet of lightness of 9.2 through a 180-mesh screen, and the printed ink was dried completely to obtain a printed matter having a coating film of microcapsular thermochromic color-memory pigment of 20 µm thick.

The printed matter was fixed on a prescribed fixation position of a color difference meter (Model TC-3600, produced by Tokyo Denshoku K.K.). The fixation position was heated and cooled in temperature difference range of 70° C. at a heating or cooling rate of 10° C./min. For instance, in Example 1, the measurement was started at −10° C., and the printed matter was heated up to 60° C. at a heating rate of 10° C./min and subsequently cooled to −10° C. again at a cooling rate of 10° C./min. Color change curves as illustrated in the Figure were prepared by plotting the lightness value read with the color difference meter as a function of the temperature, from which were obtained the values of $T_1$, $T_2$, $T_3$, $T_4$, $T_H$ (temperature corresponding to the middle point of the color density change in the color-developing process), $T_G$ (temperature corresponding to the middle point of the color density change in the decoloring process), and ΔH (line section HG).

(Measurement of Contrast)

In the measurement of the above hysteresis characteristics, the lightness $V_E$ (e.g., at −10° C. in Example 10, and the lightness value $V_F$ (e.g., at 60° C. in Example 10) were read with the color difference meter (TC-3600, produced by Tokyo Denshoku K.K.). The contrast ΔV was calculated from $V_F - V_E$

EXAMPLES 13 TO 19

The thermochromic color-memory compositions were prepared respectively in the same manner as in Example 12 except that the component (c) only was changed. The hysteresis characteristics were measured in the same manner as in Example 12.

The results of experiments are shown in Table 2 including the component (c) employed, and measured values of $T_1$, $T_2$, $T_3$, $T_4$, $T_H$ (temperature corresponding to the middle point of the color density change in the color-developing process), $T_G$ (temperature corresponding to the middle point of the color density change in the decoloring process), ΔH (line section HG), $V_E$, $V_F$, and ΔV (=$V_F - V_E$).

EXAMPLE 20

3.0 Parts of 6-(ethylisobutylamino)benzo-α-fluoran as the electron-donating color-developing organic compound (a), 8.0 parts of 2,2-bis(4-hydroxyphenyl)propane as the phenolic compound (b), and 50.0 parts of n-laurophenone as the component (c) were enclosed in microcapsules in the same manner as in the above Examples to obtain a microcapsular thermochromic color-memory pigment which changes its color between pink and non-color.

EXAMPLE 21

1.5 Parts of 3-(4-diethylamino-2-ethoxyphenyl)-3-(1-ethyl-2-methylindolyl-3-yl)-4-azaphthalide as the electron-donating color-developing organic compound (a), 8.0 parts of 2,2-bis(4-hydroxyphenyl)propane as the phenolic compound (b), and 50.0 parts of n-laurophenone as the component (c) were enclosed in the same manner as in the above Examples to obtain a microcapsular thermochromic color-memory pigment which changes its color between blue and non-color.

The microcapsular thermochromic color-memory pigments obtained in Example 20 and 21 were tested for the color-changing characteristics, and the lightness was read in the same manner as in Example 12, and the contrast $\Delta V$ was calculated from $V_F - V_E$. The measured values were shown in Table 3.

EXAMPLES 22 TO 31

A microcapsular thermochromic color-memory pigment was prepared in the same manner as in Example 12 except that the component (c) was selected from aliphatic ketones. The resulting microcapsular pigments had respectively a water content of about 40% by weight and changed the color between black and non-color. Then printed matters employing the microcapsular pigments were prepared in the same manner as in Example 12 for measurement of the hysteresis characteristics.

The printed matter was fixed on a prescribed fixation position of a color difference meter (Model TC-3600, produced by Tokyo Denshoku K.K.). The fixation position was heated or cooled in temperature difference range of 50° C. at a heating or cooling rate of 10° C./min. For instance, in Example 22, the measurement was started at −30° C., and the printed matter was heated up to 20° C. at a heating rate of 10° C./min and subsequently cooled to −30° C. again at a cooling rate of 10° C./min. Color change curves as illustrated in the Figure were prepared by plotting the lightness value read with the color difference meter as a function of the temperature, from which were obtained the values of $T_1$, $T_2$, $T_3$, $T_4$, $T_H$ (temperature corresponding to the middle point of the color density change in the color-developing process), $T_G$ (temperature corresponding to the middle point of the color density change in the decoloring process), and $\Delta H$ (line section HG).

(Measurement of Contrast)

In the measurement of the above hysteresis characteristics, the lightness $V_E$ (e.g., at −30° C. in Example 22), and the lightness value $V_F$ (e.g., at 20° C. in Example 22) were read with the color difference meter (TC-3600, produced by Tokyo Denshoku K.K.). The contrast $\Delta V$ was calculated from $V_F - V_E$.

The results of experiments are shown in Table 4 including the component (c) employed, and measured values of $T_1$, $T_2$, $T_3$, $T_4$, $T_H$ (temperature corresponding to the middle point of the color density change in the color-developing process), $T_G$ (temperature corresponding to the middle point of the color density change in the decoloring process), $\Delta H$ (line section HG), $V_E$, $V_F$, and 66 V ($=V_F - V_E$).

EXAMPLE 32

(Preparation of Microcapsular Thermochromic Color-Memory Pigment)

3.0 Parts of 6-(ethylisobutylamino)benzo-α-fluoran as the electron-donating color-developing organic compound (a), 8.0 parts of 2,2-bis(4-hydroxyphenyl)propane as the phenolic compound (b), and 50.0 parts of 8-pentadecanone as the component (c) were mixed, and the mixture was heated up to 120° C. to dissolve the components to obtain a homogeneous solubilized mixture of the three components.

The mixture was further mixed with a solution of 10 parts of Epon 828 [epoxy resin, produced by Yuka Shell Epoxy K.K.] in 10 parts of methyl ethyl ketone. The resulting mixture was added dropwise into 100 parts of aqueous 10% gelatin solution, and was stirred to form fine droplet thereof. Thereto, a solution of 5 parts of a curing agent, Epi Cure U (an epoxy resin amine adduct, produced by Yuka Shell Epoxy K.K.) in 45 parts of water was added gradually with stirring, and the mixture was stirred for about 5 hours at 80° C. to obtain a microcapsule suspension. The resulting microcapsules were collected by centrifugation to obtain a microcapsular thermochromic color-memory pigment which had a water content of 40% by weight and average particle diameter of 10 μm, and capable of changing the color between pink and non-color.

EXAMPLE 33

1.5 Parts of 3-(4-diethylamino-2-ethoxyphenyl-3-(1-ethyl-2-methylindole-3-yl)-4-azophthalide as the electron-donating color-developing organic compound (a), 8.0 parts of 2,2-bis(4-hydroxyphenyl)propane as the phenolic compound (b), and 50.0 parts of 8-pentadecanone as the component (c) were enclosed in the same manner as in Example 32 to obtain a microcapsular thermochromic color-memory pigment which changes its color between blue and non-color.

The pigments obtained in Examples 32 and 33 were respectively employed in the same formulation and the same method as in Example 12 to conduct screen printing through a 180-mesh screen on a white wood-free paper of lightness of 9.2. The printed matters were subjected to measurement of color changing characteristics and the lightness values with the color difference meter used in Example 12. Therefrom the contrast $\Delta V$ ($=V_F - V_E$) was calculated. The measured values were shown in Table 5.

Application Example 1

A homogeneous solubilized mixture of the three components of (a) 3 parts of 3-dibutylamino-6-methyl-7-anilinofluoran, (b) 8 parts of 1,1-bis(4-hydroxyphenyl)-3-methylbutane and (c) 50 parts of n-laurophenone was enclosed in microcapsules by interfacial polymerization of epoxy resin/amine to prepare a microcapsular thermochromic color-memory pigment having an average particle diameter of 10 μm. The resulting microcapsular thermochromic color-memory pigment had reversible thermochromism characteristics between black and non-color ($T_1$: −6° C., $T_4$: 46° C.).

An ink was prepared by dispersing the microcapsular thermochromic color-memory pigment in an ethylene-vinyl acetate emulsion. A thermochromic recording paper sheet was prepared by applying the above ink through a 180-mesh screen on a surface of a white wood-free paper sheet.

The recording paper sheet was black visually in ordinary state, and turned white on heating to 46° C. or higher. This state was retained at room temperature of about 25° C. On cooling to −6° C. or lower, the paper sheet turned black, and this state was retained at room temperature.

Any of the black state and the white state could be retained reversibly at ordinary temperature range. When writing was conducted with a heated pen (55° C.) on the recording paper sheet in the black state, white recording was observed visually. On the other hand, when writing was conducted with a cooled pen (−10° C.) on the recording paper sheet in the white state, black recording was observed visually. These states were retained at ordinary temperature.

Application Example 2

A homogeneous solubilized mixture of the three components of (a) 3 parts of 3-dibutylamino-6-methyl-7-anilinofluoran, (b) 8 parts of 1,1-bis(4-hydroxyphenyl)-3-methylbutane and (c) 50 parts of 8-pentadecanone was enclosed in microcapsules by interfacial polymerization of epoxy resin/amine to prepare a microcapsular thermochromic color-memory pigment having an average particle diameter of 10 μm. The resulting microcapsular thermochromic color-memory pigment had reversible thermochromism characteristics between black and non-color ($T_1$: 7° C., $T_4$: 39° C.).

An ink was prepared by dispersing the microcapsular thermochromic color-memory pigment in an ethylene-vinyl acetate emulsion. A thermochromic recording paper sheet was prepared by applying the above ink through a 180-mesh screen on a surface of a white wood-free paper sheet.

The recording paper sheet was black visually in an ordinary state, and turned white on heating to 40° C. or higher. This white state was retained at room temperature of about 25° C. On cooling to about 7° C. or lower, the paper sheet turned black, and this black state was retained at room temperature.

Any of the black state and the white state could be retained reversibly at ordinary temperature. When writing was conducted with a heated pen (55° C.) on the recording paper sheet in the black state at room temperature, white recording was observed visually. On the other hand, when writing was conducted with a cooled pen (−10° C.) on the recording paper sheet in the white state, black recording was observed visually. These states were retained at ordinary temperature.

Application Example 3

A homogeneous solubilized mixture of the three components of (a) 3 parts of 3-dibutylamino-6-methyl-7-anilinofluoran, (b) 8 parts of 1,1-bis(4-hydroxyphenyl)-3-methylbutane and (c) 50 parts of n-decanophenone was enclosed in microcapsules by interfacial polymerization of epoxy resin/amine to obtain a microcapsular thermochromic color-memory pigment having an average particle diameter of 10 μm. The obtained microcapsular thermochromic color-memory pigment had reversible thermochromism characteristics between black and non-color ($T_1$: −23° C., $T_4$: 36° C.).

An ink was prepared by dispersing 40 parts of the microcapsular thermochromic color-memory pigment in 60 parts of aqueous colorless transparent ink vehicle mainly composed of an acrylate emulsion. The ink was applied on a white wood-free paper sheet, on which polka dots had been printed in clear chromatic colors of pink, blue, and yellow, through a 109-mesh screen to obtain a thermochromic color-memory printed matter.

The printed matter was black visually at room temperature of about 20° C. and the underlying colorful polka dots were hidden by the black color and not visualized at all. On heating to 36° C. or higher, the black color disappeared to visualize the clear pink, blue, and yellow polka dots.

This state was retained at room temperature of about 20° C. On cooling to −23° C. or lower, the printed matter turned black to hide visually the clear pink, blue, and yellow polka dots completely.

Application Example 4

A homogeneous solubilized mixture of the three components of (a) 3 parts of 3-dibutylamino-6-methyl-7-anilinofluoran, (b) 8 parts of 1,1-bis(4-hydroxyphenyl)-3-methylbutane and (c) 50 parts of 2-pentadecanone was enclosed in microcapsules by interfacial polymerization of epoxy resin/amine to prepare a microcapsular thermochromic color-memory pigment having an average particle diameter of 10 μm. The resulting microcapsular thermochromic color-memory pigment had reversible thermochromism characteristics between black and non-color ($T_1$: 8° C., $T_4$: 39° C.).

An ink was prepared by dispersing 40 parts of the microcapsular thermochromic color-memory pigment in 60 parts of aqueous colorless transparent ink vehicle mainly composed of an acrylate emulsion. The ink was applied on a white wood-free paper sheet, on which polka dots had been printed in clear chromatic colors of pink, blue, and yellow, through a 109-mesh screen to obtain a thermochromic color-memory printed sheet.

The printed sheet was black visually in an ordinary state and the underlying colorful polka dots were hidden by the black color and not visualized at all. On heating to 40° C. or higher, the black color disappeared to visualize the clear pink, blue, and yellow polka dots.

This state was retained at room temperature of about 25° C. On cooling to about 8° C. or lower, the printed sheet turned black again to hide visually the clear pink, blue, and yellow polka dots completely.

Any of the black state and the chromatic state could be retained in ordinary temperature range reversibly. When writing was conducted with a heated pen (55° C.) on the above printed sheet in the black state, colorful chromatic recording was observed visually. On the other hand, when writing was conducted with a cooled pen (0° C.) on the printed sheet having a colorful polka dot pattern, black recording was observed visually. These states were retained at ordinary temperature.

Comparative Examples 1 to 5

3.0 Parts of 3-dibutylamino-6-methyl-7-anilinofluoran as the electron-donating color-developing organic compound (a), 8.0 parts of 2,2-bis(4-hydroxyphenyl)propane as the phenolic compound (b), and 50.0 parts of a known ester compound having color-memory characteristics as the component (c) were mixed, and the mixture was heated with stirring up to 120° C. to dissolve the components to obtain a homogeneous solubilized mixture of the three components. The mixture was further mixed with a solution of 10 parts of Epon 828 [epoxy resin, produced by Yuka Shell Epoxy K.K.] in 10 parts of methyl ethyl ketone. The resulting mixture was added dropwise into 100 parts of aqueous 10% gelatin solution, and was stirred to form fine droplet thereof. Thereto, a solution of 5 parts of a curing agent, Epi Cure U (an epoxy resin amine adduct, produced by Yuka Shell Epoxy K.K.) in 45 parts of water was added gradually, and the mixture was stirred for about 5 hours at 80° C. to obtain a microcapsule suspension. The resulting microcapsules were collected by centrifugation to obtain a microcapsular thermochromic color-memory pigment which had a water content of 40% by weight, and capable of changing the color between black and non-color. The color change characteristics and the lightness were measured in the same manner as in Example 12, and the contrast $\Delta V$ ($=V_F-V_E$) was calculated.

The measured values are shown in Table 6.

Comparative Example 6

3.0 Parts of 6-(ethylisobutylamino)benzo-α-fluoran as the electron-donating color-developing organic compound (a), 8.0 parts of 2,2-bis(4 -hydroxyphenyl)propane as the phenolic compound (b), and 50.0 parts of n-heptyl stearate as the component (c) were enclosed in microcapsules in the same manner as in the above Examples to obtain a microcapsular thermochromic color-memory pigment which changes its color between pink and non-color.

Comparative Example 7

1.5 Parts of 3-(4-diethylamino-2-ethoxyphenyl)-3-(1-ethyl-2-methylindole-3-yl)-4-azophthalide as the electron-donating color-developing organic compound (a), 8.0 parts of 2,2-bis(4-hydroxyphenyl)propane as the phenolic compound (b), and 50.0 parts of n-heptyl stearate as the component (c) were enclosed in microcapsules in the same manner as in the above Examples to obtain a microcapsular thermochromic color-memory pigment which changes its color between blue and non-color.

The color change characteristics and the lightness of the microcapsular thermochromic color-memory pigments of Comparative Examples 6 and 7 were measured in the same manner as in Example 12, and the contrast $\Delta V$ is calculated as $V_F - V_E$. The obtained values are shown in Table 7.

The thermochromic color-memory composition of the present invention, particularly the one enclosed in microcapsules, is capable of changing its color reversibly between a colored state and a decolored state with a hysteresis width ($\Delta H$) ranging from 8° C. to 80° C. in dependence of color density on temperature; memorizing and retain either one of the low-temperature color and the high-temperature color at ordinary temperature; and developing reversibly and effectively either one of the colors by heating or cooling when required with extremely high contrast owing to the high color density in the colored state and less residual color density in the decolored state.

The thermochromic color-memory composition of the present invention, particularly the one enclosed in microcapsules as a pigment, is useful for various painting and printing as a paint or an ink, and for various molded articles by melt-blending with a thermoplastic resin or a wax.

TABLE 1

| Example | Component (c) | Thermochromic characteristics (°C.) | | | | | | |
|---|---|---|---|---|---|---|---|---|
| No. | Aryl alkyl ketone | $T_1$ | $T_H$ | $T_2$ | $T_3$ | $T_G$ | $T_4$ | $\Delta H$ |
| 1 | n-Hexanophenone | 4 | 6 | 8 | 15 | 20 | 26 | 14 |
| 2 | n-Octanophenone | −1 | 0 | 1 | 13 | 17 | 22 | 17 |
| 3 | n-Nonanophenone | 0 | 1 | 3 | 8 | 11 | 13 | 10 |
| 4 | n-Decanophenone | 14 | 15 | 16 | 27 | 32 | 36 | 17 |
| 5 | n-Laurophenone | 28 | 31 | 34 | 38 | 41 | 44 | 10 |
| 6 | n-Tetradecanophenone | 37 | 38 | 40 | 46 | 49 | 53 | 11 |
| 7 | n-Hexadecanophenone | 45 | 47 | 50 | 52 | 55 | 59 | 8 |
| 8 | n-Heptadecanophenone | 46 | 47 | 50 | 53 | 46 | 58 | 8 |
| 9 | n-Octadecanophenone | 54 | 56 | 59 | 60 | 54 | 67 | 8 |
| 10 | 4'-n-octylacetophenone | −27 | −25 | −23 | 3 | 9 | 15 | 34 |
| 11 | 2-acetonaphthone | −15 | −12 | −8 | −2 | 10 | 40 | 22 |

TABLE 2

| Example | Component (c) | Thermochromic characteristics (°C.) | | | | | | | | | |
|---|---|---|---|---|---|---|---|---|---|---|---|
| No. | Aryl alkyl ketone | $T_1$ | $T_H$ | $T_2$ | $T_3$ | $T_G$ | $T_4$ | $\Delta H$ | $V_E$ | $V_F$ | $\Delta V$ |
| 12 | n-Laurophenone | −6 | 0 | 4 | 35 | 40 | 46 | 40 | 2.31 | 9.06 | 6.75 |
| 13 | n-Decanophenone | −23 | −18 | −12 | 24 | 29 | 36 | 47 | 2.47 | 9.06 | 6.59 |
| 14 | n-Tetradacanophenone | 28 | 31 | 32 | 46 | 50 | 53 | 19 | 1.98 | 8.69 | 6.71 |
| 15 | n-Hexadecanophenone | 22 | 26 | 30 | 48 | 54 | 61 | 28 | 2.21 | 8.97 | 6.76 |
| 16 | n-Heptadecanophenone | 24 | 27 | 32 | 53 | 56 | 62 | 29 | 2.07 | 8.89 | 6.82 |
| 17 | n-Octadecanophenone | 32 | 36 | 40 | 60 | 64 | 70 | 28 | 2.21 | 8.94 | 6.73 |
| 18 | n-Octanophenone | −47 | −39 | −32 | 7 | 12 | 18 | 51 | 2.03 | 8.92 | 6.89 |
| 19 | 4'-n-Octylacetophenone | −60 | −54 | −50 | 9 | 14 | 20 | 68 | 2.12 | 8.54 | 6.42 |

TABLE 3

| Example | Component (c) | Thermochromic characteristics (°C.) | | | | | | | | | |
|---|---|---|---|---|---|---|---|---|---|---|---|
| No. | Aryl alkyl ketone | $T_1$ | $T_H$ | $T_2$ | $T_3$ | $T_G$ | $T_4$ | $\Delta H$ | $V_E$ | $V_F$ | $\Delta V$ |
| 20 | n-Laurophenone | −4 | 1 | 5 | 32 | 37 | 45 | 38 | 4.29 | 9.08 | 4.99 |
| 21 | n-Laurophenone | −4 | 1 | 5 | 32 | 37 | 45 | 38 | 3.81 | 9.12 | 5.31 |

TABLE 4

| Example No. | Component (c) Alkyl ketone | Thermochromic characteristics (°C.) | | | | | | | | | |
|---|---|---|---|---|---|---|---|---|---|---|---|
| | | $T_1$ | $T_H$ | $T_2$ | $T_3$ | $T_G$ | $T_4$ | $\Delta H$ | $V_E$ | $V_F$ | $\Delta V$ |
| 22 | 6-Undacanone | −25 | −22 | −18 | 2 | 5 | 12 | 27 | 2.43 | 9.03 | 6.60 |
| 23 | 2-Dodecanone | −10 | −5 | −1 | 8 | 11 | 18 | 16 | 2.70 | 9.06 | 6.36 |
| 24 | 2-Tridecanone | −2 | 2 | 3 | 13 | 17 | 25 | 15 | 2.90 | 9.03 | 6.13 |
| 25 | 2-Pentadecanone | 8 | 12 | 16 | 29 | 32 | 39 | 20 | 2.66 | 9.03 | 6.37 |
| 26 | 8-Pentadecanone | 7 | 13 | 17 | 29 | 32 | 39 | 19 | 2.50 | 9.00 | 6.50 |
| 27 | 2-Hexadecanone | 21 | 23 | 26 | 38 | 41 | 48 | 17 | 2.73 | 9.02 | 6.29 |
| 28 | 3-Hexadecanone | 22 | 24 | 26 | 38 | 41 | 48 | 16 | 2.10 | 8.75 | 6.65 |
| 29 | 9-Heptadecanone | 23 | 27 | 31 | 39 | 43 | 51 | 16 | 2.48 | 8.62 | 6.14 |
| 30 | 10-Nonadecanone | 37 | 41 | 46 | 54 | 57 | 65 | 16 | 2.58 | 8.79 | 6.21 |
| 31 | 11-Henicosane | 45 | 48 | 51 | 56 | 59 | 66 | 11 | 2.60 | 8.52 | 5.92 |

TABLE 5

| Example No. | Component (c) Alkyl ketone | Thermochromic characteristics (°C.) | | | | | | | | | |
|---|---|---|---|---|---|---|---|---|---|---|---|
| | | $T_1$ | $T_H$ | $T_2$ | $T_3$ | $T_G$ | $T_4$ | $\Delta H$ | $V_E$ | $V_F$ | $\Delta V$ |
| 32 | 8-Pentadecanone | 12 | 17 | 19 | 30 | 35 | 40 | 18 | 4.05 | 9.02 | 4.97 |
| 33 | 8-Pentadecanone | 12 | 18 | 20 | 30 | 35 | 40 | 17 | 3.83 | 9.05 | 5.22 |

TABLE 6

| Comparative Example No. | Component (c) Ester | Thermochromic characteristics (°C.) | | | | | | | | | |
|---|---|---|---|---|---|---|---|---|---|---|---|
| | | $T_1$ | $T_H$ | $T_2$ | $T_3$ | $T_G$ | $T_4$ | $\Delta H$ | $V_E$ | $V_F$ | $\Delta V$ |
| 1 | n-Heptyl stearate | 18 | 20 | 21 | 30 | 31 | 33 | 11 | 2.92 | 8.21 | 5.29 |
| 2 | Neopentyl stearate | 5 | 9 | 11 | 26 | 29 | 34 | 20 | 2.98 | 8.14 | 5.16 |
| 3 | 2-Ethylbutyl stearate | 7 | 10 | 12 | 19 | 22 | 25 | 12 | 3.04 | 8.17 | 5.13 |
| 4 | Neopentyl palmitate | −6 | −3 | 1 | 19 | 21 | 24 | 14 | 2.88 | 8.23 | 5.35 |
| 5 | Dilauryl adipate | 13 | 17 | 20 | 30 | 35 | 40 | 12 | 3.07 | 8.14 | 5.07 |

TABLE 7

| Comparative Example No. | Component (c) Ester | Thermochromic characteristics (°C.) | | | | | | | | | |
|---|---|---|---|---|---|---|---|---|---|---|---|
| | | $T_1$ | $T_H$ | $T_2$ | $T_3$ | $T_G$ | $T_4$ | $\Delta H$ | $V_E$ | $V_F$ | $\Delta V$ |
| 6 | n-Heptyl stearate | 18 | 20 | 21 | 30 | 31 | 33 | 11 | 4.89 | 8.83 | 3.94 |
| 7 | n-Heptyl stearate | 18 | 20 | 21 | 30 | 31 | 33 | 11 | 4.72 | 8.85 | 4.13 |

What is claimed is:

1. A thermochromic color-memory composition comprises a homogeneous solubilized mixture of essential three components of (a) an electron-donating color-developing organic compound, (b) an electron-accepting compound, and (c) a reaction medium for controlling a color reaction of the component (a) with the component (b); the component (c) being selected from aliphatic ketones of 10 to 22 total carbons and aryl alkyl ketones of 12 to 24 total carbons; and the composition changing the color thereof with a large hysteresis width ($\Delta H$) of from 8° C. to 80° C.

2. The thermochromic color-memory composition according to claim 1, wherein the aryl alkyl ketone is selected from phenyl alkyl ketones.

3. The thermochromic color-memory composition according to claim 1, wherein the homogeneous solubilized mixture is enclosed in microcapsules.

* * * * *